Sept. 25, 1923.  
C. B. GRAY  
1,469,143  
POWER TRANSMITTING MECHANISM  
Filed Oct. 14, 1922  2 Sheets-Sheet 1

Inventor  
Charles B. Gray  
By Cyrus Kehr  
Attorney

Sept. 25, 1923.

C. B. GRAY

POWER TRANSMITTING MECHANISM

Filed Oct. 14, 1922     2 Sheets-Sheet 2

1,469,143

Inventor
Charles B. Gray
By Cyrus Kehr
Attorney

Patented Sept. 25, 1923.

1,469,143

UNITED STATES PATENT OFFICE.

CHARLES B. GRAY, OF PHILADELPHIA, PENNSYLVANIA.

POWER-TRANSMITTING MECHANISM.

Application filed October 14, 1922. Serial No. 594,515.

*To all whom it may concern:*

Be it known that I, CHARLES B. GRAY, a citizen of the United States, residing at Philadelphia, in the county of Philadelphia and State of Pennsylvania, have invented a new and useful Improvement in Power-Transmitting Mechanism, of which the following is a specification, reference being had to the accompanying drawing.

My improvement relates particularly to mechanism for transmitting power through endwise reciprocation of a member of the mechanism. The mechanism is applicable for use as actuating means for the shutters of cameras and as an actuating or releasing means for various other kinds of apparatus.

The object of the invention is to produce such a transmitting mechanism in flexible form permitting repeated bending without injury to the mechanism and in a form permitting the attainment of precise movement.

For a similar mechanism I refer to Letters Patent of the United States, No. 1,314,867, granted to me September 2, 1919, for power-transmitting mechanism.

In the accompanying drawings,

Figs. 1ª and 1ᵇ together present a longitudinal sectional view of a mechanism embodying my improvement, portions being in section;

Figure 1A:
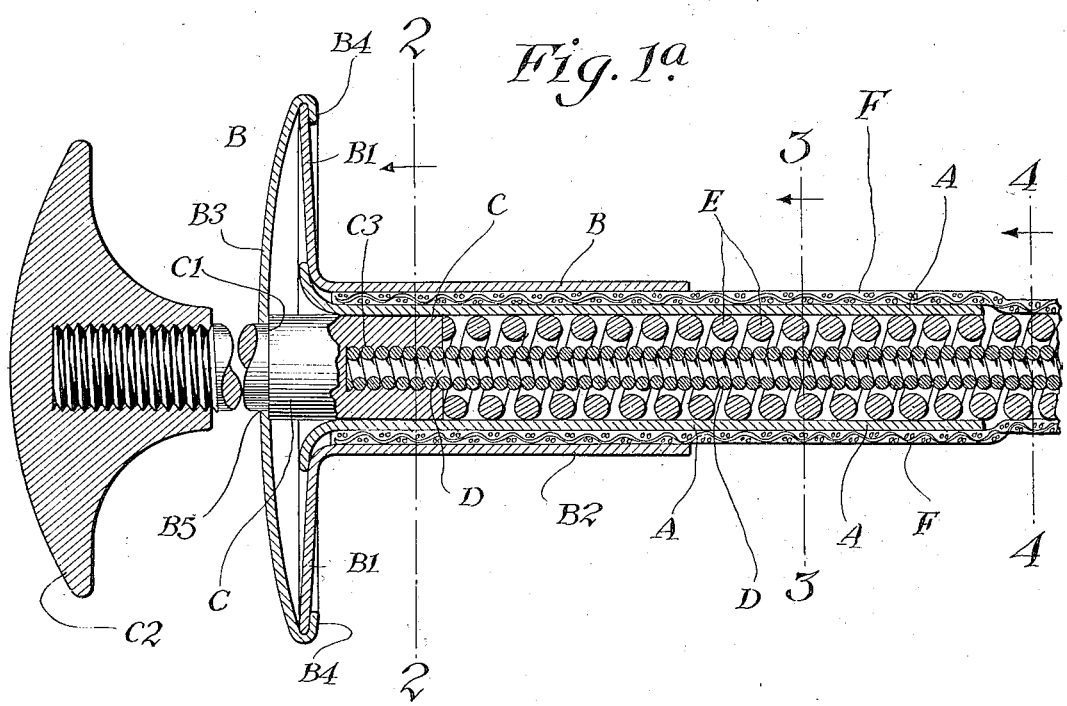
Figure 1B:
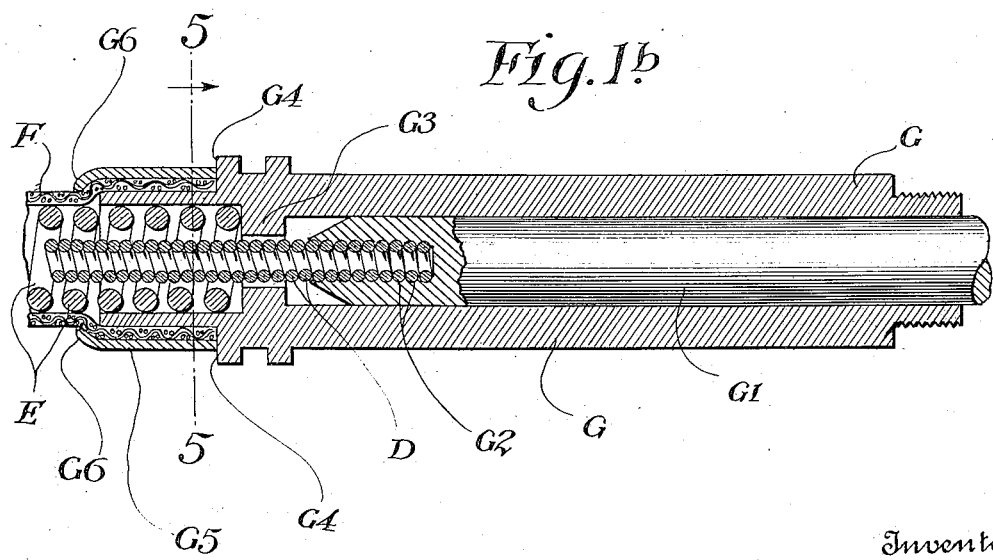
Figure 2:
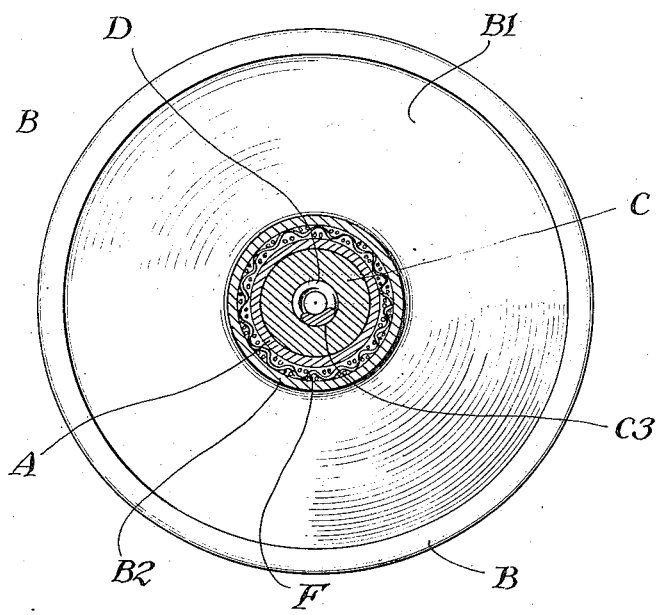
Fig. 2 is a section on the line, 2—2, of Fig. 1ª, looking toward the left.
Figure 4:
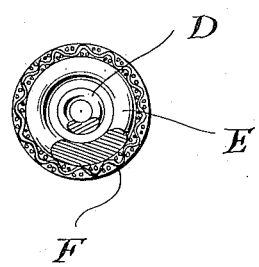
Fig. 4 is a section on the line, 4—4, of Fig. 1ª, looking toward the left.
Figure 3:
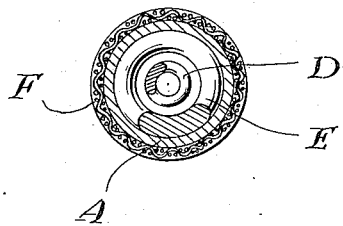
Fig. 3 is a section on the line, 3—3, of Fig. 1ª, looking toward the left.
Figure 5:
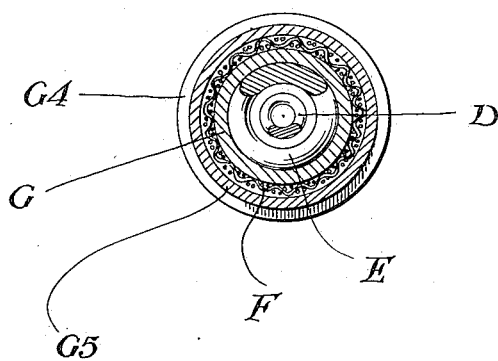
Fig. 5 is a section on the line, 5—5, of Fig. 1ᵇ, looking toward the right.

Referring to said drawings, A is a metallic tube or barrel having its left hand end flanged outward and suitably secured, as by soldering, to the inner, circular wall, $B^1$, of the head, B. On the wall, $B^1$, and extending toward the right and concentric with the barrel A is a sleeve, $B^2$. An outer convex wall, $B^3$, has a marginal flange, $B^4$, inturned and engaging the periphery of the wall, $B^1$. These two walls form the head, B. At its center, the wall, $B^3$, has an opening, $B^5$, through which the stem, C, extends. At the right of the wall, $B^3$, said stem has a shoulder, $C^1$, which normally bears against the wall, $B^3$, said wall forming a stop or abutment for the stem. On the left hand end of the stem, C, is a head, $C^2$, to be engaged by the hand of the operator. Said stem is slidable endwise in the barrel, A. The inner or left hand end of said stem is provided with a screw-threaded socket, $C^3$, which receives the adjacent end of the thrust member, D. Said member is a coiled wire tube having its coils formed to bear closely against each other, in order that said member may be adapted to transmit power applied for endwise pushing said member. The threads in the socket, $C^3$, are made of a size and pitch to fit the exterior of the coils of the thrust member.

A larger coiled spring wire tube, E, surrounds the thrust member, D, and has its left hand end extending into the barrel, A, and against the inner or right hand end of the stem, C, said end presenting a bearing or abutment face around the thrust member.

At the left of the mechanism is a tubular body, G, in which is a slide member, $G^1$, in the left hand end of which is an interiorly screw-threaded socket, $G^2$, which receives the right hand end of the thrust member, D, the coils of the thrust member being threaded into the socket.

In the tubular body, G, at the left of the slide member, $G^1$, is a cross wall, $G^3$, which loosely surrounds the thrust member, D, and forms an abutment for the right hand end of the larger coiled spring wire tube. Adjacent the cross wall, $G^3$, the body, G, has an external annular shoulder, $G^4$. A textile fabric sheath or tube surrounds the coiled tube, E, and the part of the body, G, which is at the left of the annular shoulder, $G^1$. A sleeve, $G^5$, surrounds the right hand end of the fabric sheath and bears against the shoulder, $G^4$, and binds the fabric sheath to the right hand part of the body, G. The left hand end of the sleeve, $G^5$, has an inward-turned flange, $G^6$, which deflects the sheath.

At its left hand end, the fabric sheath, F, surrounds the barrel, A, and extends between said barrel and the sleeve, $B^2$, whereby said sheath is held immovably on said barrel.

The coiled spring wire tube, E, is so wound as to leave spaces between the coils, and said tube is made long enough to cause it to be under some compression endwise when the fiber fabric sheath or tube is under tension. Thus the fiber fabric tube is normally held under tension and the coiled spring wire tube, E, is normally exerting endwise pressure. The length of the fiber fabric tube and the coiled wire tube, E, and the spacing between the coils of the tube are so proportioned as to still leave spaces between the coils of the tube, E, when the latter is held under restraint or partial compression by the fiber fabric tube or the stem is pressed forward. The spaces thus left between the coils of the tube, E, are sufficient to allow approach of adjacent coils toward each other at the inner side of the curve while there is limited or substantially no expansion of the coils at the outer side of the curve when the tube is bent.

As above stated, the shoulder, $C^1$, normally bears against the wall, $B^3$. The left hand end of the coiled wire tube, E, constantly bears against the right hand end of the stem, C, and the right hand end of the coiled wire tube, E, constantly bears against the cross wall, $G^3$.

It will now be seen that if the head, $C^2$, is pressed rightward, the stem, C, will drive the thrust member, D, rightward, whereby the slide member, $G^1$, will be given a like movement toward the right. The right hand end of the slide member is to be put into operative relation with any other member to which power is to be transmitted. The size of the mechanism is to be varied to conform to the amount of power to be transmitted and to the size of the apparatus with which the transmission mechanism is to be associated. For some purposes the mechanism may be as large or larger than shown by the drawings. For example, in power-driven vehicles, the mechanism may be made large and used for power transmission to some point distant from the driver, the head, $C^2$, being used as a pedal. As above stated, the coils of the thrust member, D, bear against each other, so that the transmission through that member is non-yielding. The strength of the wire forming the thrust member is to be sufficient to draw the slide member, $G^1$, toward the left when the thrust member is drawn toward the left by the leftward movement of the stem, C, when the head, $C^2$, is released and the outer coiled wire tube, E, presses the stem, C, to its leftward limit.

The position of the slide member, $G^1$, when said member and the thrust member and the stem, C, are at rest may be adjusted by turning the thrust member in the socket, $C^3$, or in the socket, $G^2$, whereby the thrust member is shifted endwise in said socket.

As to this mechanism, the slide member, $G^1$, is to be regarded as the final member in the transmission.

It will be observed that the two walls, $B^1$ and $B^3$, of the head, B, and the barrel, A, and the sleeve, $B^2$, together form a rigid structure. Furthermore, said structure serves as a supporting structure; for the barrel of that structure supports the stem, C, and the larger coil spring wire tube, E, and the fabric sheath, F. Furthermore, said structure includes means for limiting the endwise movement of the stem in the reverse direction, the wall, $B^3$, constituting an abutment against which the shoulder, $C^1$, of the stem rests when the stem is not being pressed inward or toward the body, G, by the operator.

The coils in the thrust member are wound in one direction while the coils in the larger wire tube are preferably wound in the opposite direction.

Any suitable adhesive may be used for securing the fabric sheath to the barrel, A, and to the body, G. If the parts are to be separated, the adhesive may be softened or dissolved.

This mechanism comprises two important features. One of these is the closely-wound thrust member coiled wire transmission tube, D, connected with the stem, C, and the slide member, $G^1$, whereby there may be transmission without lost motion. The other of these features is the forming of the outer coiled wire tube, E, in such manner as to permit bending the tube without material separation of the coils at the outer side of the curve, the spacing between the coils permitting the coils to approach each other on the inner side of the curve while the tube is being bent. The slide member, $G^1$, being free to slide, the adjacent end of the thrust member, D, is free to move endwise when the mechanism is being bent. In this manner, the thrust member, although closely wound, adapts itself to the bending without kinking.

Practice has shown that a mechanism of this construction may be bent an indefinite number of times without kinking or otherwise disabling the coiled wire tubes.

I claim as my invention,

1. In a mechanism of the kind described, the combination of a tubular thrust member composed of closely coiled wire, a larger coiled spring wire tube surrounding the thrust member and having spaced coils, a fabric sheath surrounding the larger coiled wire tube, a stem in engagement with one end of the thrust member and bearing against the adjacent end of the larger coiled wire tube, a supporting structure surrounding a part of said stem and a part of the larger coiled wire tube and forming a guide and lateral support for said parts and being attached to the adjacent end of the fabric sheath, and a body surrounding the opposite end of the thrust member and attached to the opposite end of the fabric sheath and bearing against the opposite end of the larger coiled wire tube, substantially as described.

2. In a mechanism of the kind described, the combination of a tubular thrust member composed of closely coiled wire, a larger coiled spring wire tube surrounding the thrust member and having spaced coils, a fabric sheath surrounding the larger coiled wire tube, a stem in engagement with one end of the thrust member and bearing against the adjacent end of the larger coiled wire tube, a supporting structure including a head and a barrel and surrounding a part of said stem and a part of the larger coiled wire tube and forming a guide and lateral support for said parts and being attached to the adjacent end of the fabric sheath, and a body surrounding the opposite end of the thrust member and attached to the opposite end of the fabric sheath and bearing against the opposite end of the larger coiled wire tube, substantially as described.

3. In a mechanism of the kind described, the combination of a tubular thrust member composed of closely coiled wire, a larger coiled spring wire tube surrounding the thrust member and having spaced coils, a fabric sheath surrounding the larger coiled wire tube, a stem in engagement with one end of the thrust member and bearing against the adjacent end of the larger coiled wire tube, a supporting structure including a barrel and a sleeve and a head, said structure surrounding a part of said stem and a part of the larger coiled wire tube and forming a guide and lateral support for said parts and being attached to the adjacent end of the fabric sheath, and a body surrounding the opposite end of the thrust member and attached to the opposite end of the fabric sheath and bearing against the opposite end of the larger coiled wire tube, substantially as described.

4. In a mechanism of the kind described, the combination of a tubular thrust member composed of closely coiled wire, a larger coiled spring wire tube surrounding the thrust member and having spaced coils, a fabric sheath surrounding the larger coiled wire tube, a stem in engagement with one end of the thrust member and bearing against the adjacent end of the larger coiled wire tube, a supporting structure including a barrel and a hollow head and surrounding a part of said stem and a part of the larger coiled wire tube and forming a guide and lateral support for said parts and being attached to the adjacent end of the fabric sheath, and a body surrounding the opposite end of the thrust member and attached to the opposite end of the fabric sheath and bearing against the opposite end of the larger coiled wire tube, substantially as described.

5. In a mechanism of the kind described, the combination of a tubular thrust member composed of closely coiled wire, a larger coiled spring wire tube surrounding the thrust member and having spaced coils, a fabric sheath surrounding the larger coiled wire tube, a stem in engagement with one end of the thrust member and bearing against the adjacent end of the larger coiled wire tube, a supporting structure including a barrel and two circular walls joined to each other at their peripheries and said structure surrounding a part of said stem and a part of the larger coiled wire tube and forming a guide and lateral support for said parts and being attached to the adjacent end of the fabric sheath, and a body surrounding the opposite end of the thrust member and attached to the opposite end of the fabric sheath and bearing against the opposite end of the larger coiled wire tube, substantially as described.

In testimony whereof I have signed my name, this 2nd day of October, in the year one thousand nine hundred and twenty-two.

CHARLES B. GRAY.